3,732,274
Patented May 8, 1973

3,732,274
NOVEL FLUOROALKYL CHLOROFORMATES AND A METHOD FOR THEIR PREPARATION
David Edward Young, Denville, Lowell Ray Anderson, Parsippany, Douglas Eugene Gould, Dover, and William Burke Fox, Morristown, N.J., assignors to Allied Chemical Corporation, New York, N.Y.
No Drawing. Filed Aug. 25, 1969, Ser. No. 852,896
The portion of the term of the patent subsequent to Dec. 14, 1988, has been disclaimed
Int. Cl. C07c 69/64; A01n 9/12
U.S. Cl. 260—463       10 Claims

ABSTRACT OF THE DISCLOSURE

Hydrogen containing fluoroalkyl chloroformates of formula:

$$R_3COC(O)Cl$$

wherein R is selected from the group consisting of hydrogen, alkyl, fluoroalkyl and aryl with the proviso that at least one R substituent is fluoroalkyl, and at least one carbon-hydrogen bond is present in the molecule. The alkyl and fluoroalkyl moieties may be made up of the same or a different number of carbon atoms and each may contain up to six carbons (lower alkyl), in a straight or branched chain structure and when R contains six carbon atoms, it may represent cyclic alkyl. These novel hydrogen containing fluorinated chloroformate products belong to a class of halogenated alkyl chloroformates, being useful as intermediates for the preparation of corresponding carbonate esters; peroxides; as polymerization catalysts and as insecticides and fumigants.

These novel hydrogen containing fluorinated chloroformates may be prepared by reacting the corresponding hypochlorite having the formula:

$$R_3COCl$$

wherein R is defined as above, with carbon monoxide at a temperature of up to 75° C., or higher. This method may also be used to prepare tertiary perfluorinated alkyl chloroformates having no hydrogen-to-carbon bonds in the molecule.

CROSS REFERENCE TO RELATED APPLICATIONS

Application of D. E. Young et al., entitled "Process for the Preparation of Polyhaloalkyl Chloroformates," Ser. No. 771,369, filed Oct. 28, 1968, now U.S. Pat. No. 3,627,799 which disclosure is specifically herein incorporated by reference. Copending application of D. E. Gould et al., entitled "Novel Hydrogen-Containing Fluoroalkyl Hypochlorites and the Process for the Preparation Thereof," Ser. No. 830,864, filed June 5, 1969, which disclosure is specifically herein incorporated by reference.

BACKGROUND OF THE INVENTION

The fluoroalkyl chloroformates of this invention are characterized in that they contain at least one carbon-hydrogen bond and do not contain an α-halogenated carbon atom, i.e., one which is adjacent to the chloroformate group (—OC(O)Cl). The hydrogen containing fluorinated chloroformates of this invention are made by reacting the corresponding hypochlorite with carbon monoxide at about −25° to 75° C., or higher.

The method of this invention is distinguished from the method disclosed in U.S. Pat. No. 3,627,799, supra, in that the reaction may be conducted at reaction temperatures considerably above 25° C. At higher temperatures, hypochlorites having a halogen substituent on the carbon atom adjacent to the chloroformate group, as described in the above copending application, Ser. No. 771,369, react to produce large amounts of undesirable by-product $$XC(O)Cl$$

where X=halogen, and yield little or no chloroformate. The method disclosed in the above application appears in a communication published by the present inventors, entitled "Perfluoroalkyl Chloroformates and Chlorosulfates," in Tetrahedron Letters No. 9, pp. 723–726 (1969).

SUMMARY OF THE INVENTION

We have discovered compounds belonging to the general class of hydrogen-containing fluorinated chloroformates having the formula:

$$R_3COC(O)Cl$$

wherein each R is selected from the group consisting of hydrogen, alkyl, fluoroalkyl and aryl with the proviso that at least one R substituent is fluoroalkyl, and at least one carbon-hydrogen bond is present in the molecule. The alkyl and fluoroalkyl moieties may contain up to six carbons (lower alkyl), in a straight or branched chain structure and when R contains six carbon atoms, it may represent cyclic alkyl. The aryl group may be phenyl, benzyl or tolyl. Thus,

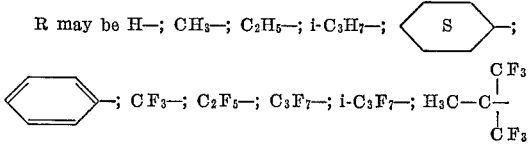

and the like.

The compounds of this invention are prepared by reacting the corresponding hypochlorite $R_3COCl$, wherein R is as defined above, with carbon dioxide at temperatures of about −25° C. to 75° C., or higher, to yield the novel hydrogen-containing fluorinated chloroformates. The reaction may be represented as follows:

$$(CF_3)_2CHOCl + CO \xrightarrow{25°\ C.} (CF_3)_2CHOC(O)Cl$$

The method used for the preparation of these new compounds, by reacting carbon monoxide at up to about 75° C., or higher, with the corresponding hypochlorite, renders substantially quantitative yields. In U.S. Pat. No. 3,627,799, carbon monoxide is also used to prepare related chloroformates having a halogen (fluorine) on the carbon adjacent to the chloroformate moiety, at temperature of up to 25° C. or higher. However, with α-halogenated hypochlorites, the higher the reaction temperature (above 25° C.), the lower the yield of chloroformates. At these higher temperatures in U.S. Pat. 3,627,799, yields are very low at best. Moreover, this method, using temperatures of up to 75° C. or higher, is generally applicable in the preparation of perfluorinated tertiary alkyl chloroformates which do not contain a carbon-hydrogen bond and do not have an α-fluorine atom. These compounds may be represented by the following formula:

$$RCOC(O)Cl$$

wherein each R may be the same or different perfluoroalkyl group.

DETAILED DESCRIPTION OF THE PREFERRED EMBODIMENTS

The new chloroformates of this invention contain at least one fluoroalkyl group, at least one carbon-hydrogen bond and do not contain an α-halogen on the carbon adjacent to the chloroformate moiety. This latter feature chemically distinguishes these compounds from those having an α-halogen, as for instance in the reaction with CsF, as follows:

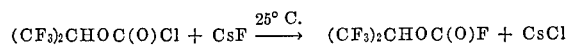

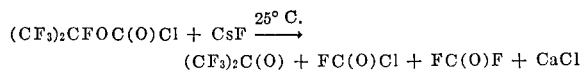

The fluorinated chloroformates of this invention belong to a class of chloroformates which are useful as catalysts for the polymerization of unsaturated compounds (Belgium Pat. 616,933); for the preparation of polycarbonates (U.S.S.R. Patent 138,030); for the preparation of poly (acyl) carbonates (German Pat. 1,188,811); for the preparation of formaldehyde polymers (British Pat. 922,988); for the preparation of esters (U.S. Pat. 3,089,884); and for use as insecticides and fumigants (U.S. Pat. 3,359,296).

A preferred class of compounds within the scope of this invention are those in which the fluoroalkyl moieties are perfluoroalkyl and which contain more fluorine atoms than hydrogen atoms in the molecule; although compounds having less than 50 percent fluorine atoms based on the hydrogen atoms present are also made possible by this invention.

Within the preferred class of compounds are those in which the R substitutes are $CF_3$ and $CH_3$ or H, such as are represented in the following formulae:

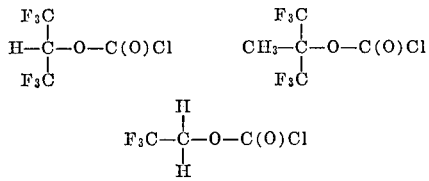

Other hydrogen containing fluorinated chloroformates included within the scope of this invention are:

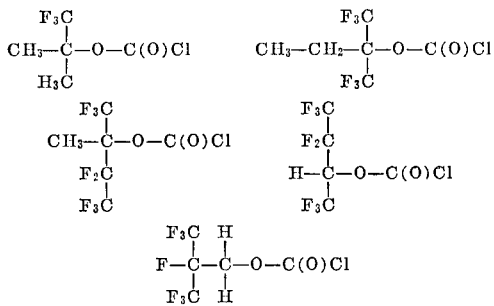

The compounds of this invention may be prepared by condensing the corresponding hydrogen-containing fluoroalkyl hypochlorite with carbon monoxide using conventional vacuum techniques. (The hydrogen-containing fluoroalkyl hypochlorite starting materials may be prepared as described in copending application Ser. No. 830,864, supra.) The reactants are mixed at sub-zero temperatures of for instance $-196°$ C., and are permitted to warm to between about $-25°$ to $75°$ C., or even higher, and preferably about $25°$ C., after which the mixture is shaken for about 20 hours, or for a time sufficient to complete the reaction. There is no particular advantage in the use of higher or lower temperatures, since the reaction readily takes place at room temperature in excellent yield, and as mentioned above, this temperature is preferred. Excess CO is removed, along with minor impurities, by fractionation through a cold trap, leaving a liquid product representing the chloroformate. The temperature of the cold trap is usually set slightly below the temperature at which the desired product has significant volatility.

In order to insure complete reaction, at least the stoichiometric amount or preferably an excess of the carbon monoxide reactant is employed, although larger quantities will not deleteriously effect the reaction.

The reaction may be conducted in a closed system such as described in the appended examples or in a flow system as known in the art. The particular apparatus is selected based upon the availability of materials and preference of one skilled in the art. The apparatus, of course, must be constructed of a material inert to the reactants, such as stainless steel, polychlorotrifluoroethylene and the like.

The autogenous pressures developed within the system may vary from one reaction to another and during a reaction. The pressure within the system is not critical and the reaction is usually conducted under the pressure developed during the reaction and from the added carbon monoxide.

An inert solvent may be employed such as for example HF and $CFCl_3$, without departing from the spirit of this invention.

The following examples are intended to illustrate specific embodiments of this invention and are not intended to limit the scope thereof.

EXAMPLE 1

Preparation of $(CF_3)_2CHOC(O)Cl$

Conventional vacuum techniques in a Monel Metal-nickel system were used to condense $(CF_3)_2CHOCl$ (10 mmol) and CO (15 mmol) at $-196°$ C., into a stainless steel reaction cylinder equipped with a Hoke valve. The reactor was allowed to warm to $0°$ C. After several hours, the excess CO was removed by fractionation through a $-80°$ C. cold trap in which remained essentially pure $(CF_3)_2CHOC(O)Cl$. The clear, colorless liquid was identified by its infrared spectrum, its $F^{19}$ n.m.r. spectrum, and by elemental analysis.

*Elemental Analysis.*—Found (percent): C, 20.92; F, 49.30; Cl, 15.69. Calc'd (percent): C, 20.82; F, 49.46; Cl, 15.38.

EXAMPLE 2

Preparation of $(CF_3)_2(CH_3)COC(O)Cl$ $(CF_3)_2(CH_3)COCl$ (10 mmol) and CO (15 mmol) were vacuum condensed into a Monel Metal-nickel system as in Example 1, and allowed to react at $25°$ C. for 24 hours. The chloroformate product was isolated by fractionation through a $-65°$ C. cold trap and was identified by its infrared spectrum, its $F^{19}$ and $H^1$ n.m.r. spectra, and by elemental analysis, as $(CF_3)_2(CH_3)COC(O)Cl$.

*Elemental Analysis.*—Found (percent): C, 23.77; F, 45.10; Cl, 14.06. Calc'd (percent): C, 24.54; F, 46.64; Cl, 14.52.

EXAMPLE 3

Preparation of $CF_3CH_2OC(O)Cl$ $CF_3CH_2OCl$ (10 mmol) and CO (15 mmol) were vacuum condensed at $-196°$ C. into a polychlorotrifluoroethylene cylinder and allowed to react as in Example 2 at $25°$ C. for 24 hours. The chloroformate was isolated by fractionation through a $-65°$ C. cold trap and was identified by its infrared spectrum, its $F^{19}$ and $H^1$ n.m.r. spectra, and by elemental analysis as $CF_3CH_2OC(O)Cl$.

*Elemental Analysis.*—Found (percent): C, 22.10; F, 34.90. Calc'd (percent): C, 22.15; F, 35.08.

The yields of chloroformate in the above examples were between 90–100 percent.

EXAMPLE 4

Reaction of $(CF_3)_2CHOC(O)Cl$ with $NaOC(CF_3)_3$

The reaction of $(CF_3)_2CHOC(O)Cl$ (3 mmol) and $NaOC(CF_3)_3$ (3 mmol) was carried out in a glass reactor with stirring using diethyl ether as solvent at $25°$ C. A white precipitate of NaCl formed in the reaction, and $[(CF_3)_2CHO]_2CO$ was separated from the solvent by fractionation of the volatile components. The yield of the carbonate ester was quantitative.

Note that the chloroformate employed in the reaction of Example 4 above, had no halogen on the carbon adjacent to the $-OC(O)Cl$ function. In the following Example 5, the chloroformate employed contains an α-fluorine.

EXAMPLE 5

Reaction of $(CF_3)_2CFOC(O)Cl$ with $NaOC(CF_3)_3$ $(CF_3)_2CFOC(O)Cl$ (4 mmol) was added to a solution of $NaOC(CF_3)_3$ (8 mmol) in diethyl ether and the reaction mixture was stirred at 25° C. for a few hours. The products of the reaction were hexafluoroacetone and $[(CF_3)_3CO]_2CO$, the carbonate ester being one evolving from decomposition of the original chloroformate starting material.

$$4(CF_3)_2CFOC(O)Cl + 8Na^+ {}^-OC(CF_3)_3 \rightarrow$$
$$4(CF_3)_2CO + 4[(CF_3)_3CO]_2CO + 4NaF + NaCl$$

Note that in the case of $(CF_3)_2CFOC(O)Cl$ (a chloroformate having a fluorine atom on the carbon adjacent to the —OC(O)Cl function), in Example 5 above, both the chlorine atom and the fluoroalkoxy group are displaced by the perfluoro-t-butoxy anion. In other words a carbonate ester having a $(CF_3)_2CFO$— grouping is not formed.

EXAMPLE 6

Reaction $(CF_3)_2CHOC(O)Cl$ with cesium fluoride

The chloroformate (2 mmol) containing no halogen atom on the carbon adjacent to the —OC(O)Cl function was reacted with approximately 5 mmol of CsF in a glass reaction tube at 25° C. for 20 hours. The reaction mixture was agitated by a magnetic stirring bar. Fractionation of the reaction revealed that 90 percent of the $$(CF_3)_2CHOC(O)Cl$$

had been converted to the corresponding fluoroformate, $(CF_3)_2CHOC(O)F$.

$$(CF_3)_2CHOC(O)Cl + CsF \xrightarrow{25°C.} (CF_3)_2CHOC(O)F + CsCl$$

Other than unconverted chloroformate, no other volatile materials were present at the termination of the reaction.

The fluoroformate product was identified by its infrared spectrum, its $F^{19}$ and $H^1$ n.m.r. spectra, and by elemental analysis.

EXAMPLE 7

Reaction of $CF_3OC(O)Cl$ with cesium fluoride

The chloroformate (2 mmol) containing three fluorine atoms on the carbon adjacent to the —OC(O)Cl function was reacted with approximately 5 mmol of CsF in a stainless steel reaction vessel at 25° C. for 20 hours. The volatile materials of the reaction mixture were investigated by infrared spectroscopy. The only products of the reaction were $COF_2$ and COFCl, and no starting chloroformate or product fluoroformate were found.

EXAMPLE 8

Preparation of $(CF_3)_3COC(O)Cl$ $(CF_3)_3COCl$ (10 mmol) and CO (15 mmol) were allowed to react as in Example 1, but at 50° C. The chloroformate product was recovered essentially pure in a −80° C. cold trap after fractionation of the reaction mixture. The clear colorless liquid was identified by its infrared spectrum, its $F^{19}$ and $H^1$ n.m.r. spectra, and by elemental analysis as $(CF_3)_3COC(O)Cl$.

*Elemental Analysis.*—Found (percent): C, 20.16; F, 56.78; Cl, 11.91. Calc'd (percent): C, 20.10; F, 57.28; Cl, 11.88.

We claim:

1. Hydrogen - containing fluoroalkyl chloroformates having the formula:

$$R_3COC(O)Cl$$

wherein each R is selected from the group consisting of a lower alkyl of the group methyl, ethyl and propyl; trifluoromethyl; and aryl; with the proviso that at least one R substituent is trifluoromethyl and at least one R substituent contains at least one hydrogen atom.

2. Hydrogen-containing fluoroalkyl chloroformates as in claim 1, wherein the total number of fluorine atoms is greater than the total number of hydrogen atoms in the molecule.

3. Hydrogen-containing fluoroalkyl chloroformates as in claim 1, wherein at least one R substituent is phenyl.

4. Hydrogen-containing fluoroalkyl chloroformates as in claim 1, wherein one R substituent is methyl and the remaining R substituents are trifluoromethyl.

5. Hydrogen-containing fluoroalkyl chloroformates as in claim 1, wherein one R substituent is phenyl and the remaining two R substituents are trifluoromethyl.

6. The process for preparing a fluoroalkyl chloroformate of the formula:

$$R_3COC(O)Cl$$

wherein each R substituent is selected from the group consisting of hydrogen, lower alkyl, lower fluoroalkyl and aryl, with the proviso that at least one R substituent is fluoroalkyl and at least one carbon hydrogen bond is present in the molecule, comprising the steps of reacting a compound of the formula:

$$R_3COCl$$

wherein said R is as defined above, with carbon monoxide, at a reaction temperature of up to about 75° C., for a time sufficient to produce said chloroformate.

7. The process for preparing fluoroalkyl chloroformates according to claim 6, wherein said reaction temperature is about 25° C.

8. The process according to claim 7 wherein the chloroformate is:

$$(CF_3)_2CHOC(O)Cl$$

9. The process according to claim 7 wherein the chloroformate is $$(CF_3)_2(CH_3)COC(O)Cl$$

10. The process according to claim 7 wherein the chloroformate is $$CF_3CH_2OC(O)Cl$$

References Cited

UNITED STATES PATENTS

| | | | |
|---|---|---|---|
| 2,959,611 | 11/1960 | Nelson et al. | 260—463 |
| 3,359,296 | 12/1967 | Newallis et al. | 260—455 |
| 3,627,799 | 12/1971 | Young et al. | 260—463 |

FOREIGN PATENTS

| | | |
|---|---|---|
| 1,292,937 | 4/1962 | France. |

OTHER REFERENCES

Hill et al. J. Org. Chem. vol. 30(2) 411–15, February 1965.

Schack et al., J. Am. Chem. Soc. vol. 91, No. 11, pp. 2902–2907, May 21, 1969.

LEWIS GOTTS, Primary Examiner

D. G. RIVERS, Assistant Examiner

U.S. Cl. X.R.

23—86; 252—426; 260—67 R, 77.5 D, 453 R; 424—301